B. B. HODGMAN.
DEVICE FOR PASSING CABLES THROUGH PIPE LINES.
APPLICATION FILED APR. 15, 1910.
1,036,114.
Patented Aug. 20, 1912.
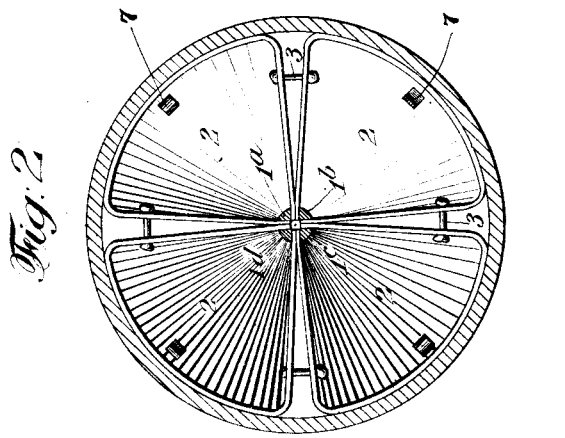
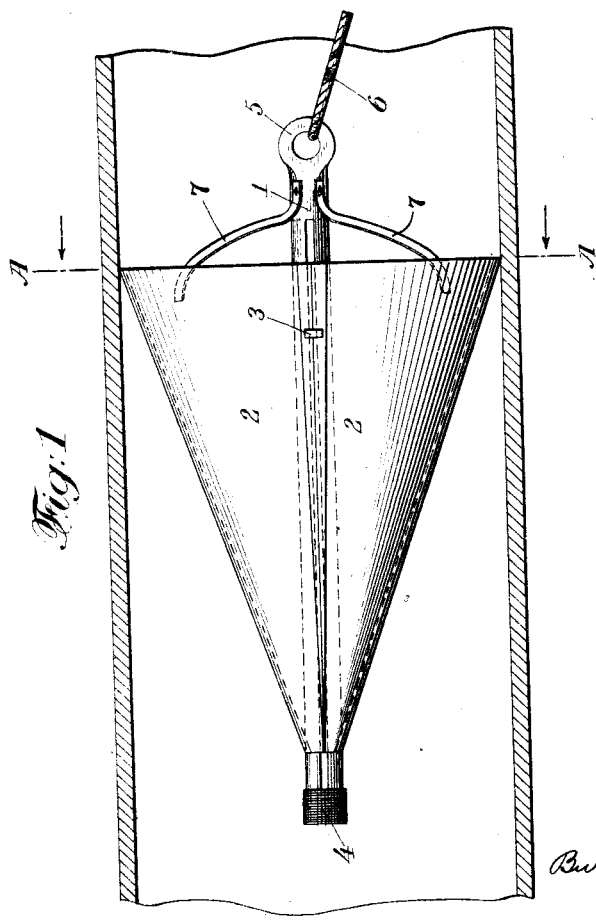
Witnesses:
John O. Gempser
George Schlatt.
Burt B. Hodgman,
Inventor,
By his Attorneys,
Kenyon & Kenyon

UNITED STATES PATENT OFFICE.

BURT B. HODGMAN, OF EAST ORANGE, NEW JERSEY, ASSIGNOR TO THE NATIONAL WATER MAIN CLEANING COMPANY, A CORPORATION OF MAINE.

DEVICE FOR PASSING CABLES THROUGH PIPE-LINES.

1,036,114.

Specification of Letters Patent.     Patented Aug. 20, 1912.

Application filed April 15, 1910. Serial No. 555,694.

*To all whom it may concern:*

Be it known that I, BURT B. HODGMAN, a citizen of the United States, and a resident of East Orange, county of Essex, and State of New Jersey, have invented certain new and useful Improvements in Devices for Passing Cables Through Pipe-Lines, of which the following is a specification.

My invention relates to devices for passing cables through pipe lines, and is adapted to prevent the stoppage of such a device in its passage through a pipe by a cup or a portion of the cup being destroyed so as to permit the water to pass by the cup without carrying it along.

In practice, where a cup carrier having one compartment is used, it sometimes occurs that an obstruction in the pipe tears the cup, and it practically becomes useless, as the water or fluid will pass the cup without propelling it through the pipe. I have found that by arranging the cup into a plurality of compartments, this is overcome, and my improved carrier described in the following specification and annexed drawings, is addressed to this feature.

In the drawings, Figure 1 shows my preferred form of carrier located within a section of pipe; Fig. 2 shows a cross section of the same looking in the direction of the arrows in Fig. 1.

In the drawings, 1 is a shaft having an eyelet 5 to which the cable 6 is to be attached. If my carrier is to be provided with four cups or compartments, as shown in the drawings, although, of course, it may be made of any number of compartments as desired, I construct the shaft 1 in the form of a split shaft, as shown in the drawing, Fig. 2, having the four sections 1ª, 1ᵇ, 1ᶜ and 1ᵈ. On the end of the shaft I provide a nut 4 adapted to hold the ends of the split shaft together after the cups have been inserted in place. The four cups 2 shown in the drawings are made of any suitable material, although I prefer to use a flexible material such as leather. For each of the compartments I provide means for holding the compartment in its desired form, such as the flat springs 7 shown in the drawings. The edges of the material of which the cups are made, are placed between the sections of the split shaft, as shown in Fig. 2, after which the head or nut 4 is placed upon the split shaft, thus holding the cups in position and holding the ends of the split shaft in position. I sometimes attach the cups together by any suitable means such as a cord or strap 3 passing through openings in the cups and knotted on the inner side of the same.

By means of my invention, it will be readily seen that if any part of the carrier becomes destroyed by catching upon an obstruction within the pipe line, it will only affect that particular part of the carrier which was destroyed, and will not affect the usefulness of the other compartments or cups. This also affords a great economy in saving of material.

Any number of cups may be used, depending upon the wishes of the user, although I prefer four, as shown. The number of cups to be used also depends somewhat upon the size of the pipe through which it is desired to have the carrier pass. The smaller the pipe, the fewer number of cups.

Having thus described my invention, what I claim as new, and desire to secure by Letters Patent, is:

1. In a device for passing cables through pipe lines, the combination of a shaft, a plurality of cups mounted on said shaft, and means independent of said shaft for connecting said cups together.

2. In a device for passing cables through pipe lines, a plurality of cup-shaped propelling elements so arranged that said cups taken together substantially fill the opening in a given cross-section of the pipe line.

3. In a device for passing cables through pipe lines, a piston composed of a split shaft, a plurality of independently acting propelling cups mounted on said shaft and held in operative relation to each other by said shaft, and a cap for holding the ends of said shaft together.

4. In a device for passing cables through pipe lines, a piston composed of a split shaft, a plurality of independently-acting propelling cups mounted on said shaft and held in operative relation to each other by said shaft, and means for holding the said split shaft together.

In testimony whereof, I have signed my name to this specification, in the presence of two subscribing witnesses.

BURT B. HODGMAN.

Witnesses:
  GEO. W. MILLS, Jr.,
  EDWIN SEGER.

Copies of this patent may be obtained for five cents each, by addressing the "Commissioner of Patents, Washington, D. C."